United States Patent [19]

Sugiyama

[11] 4,447,834

[45] May 8, 1984

[54] REPRODUCING APPARATUS FOR REPRODUCING A ROTARY RECORDING MEDIUM RECORDED WITH A COLOR VIDEO SIGNAL

[75] Inventor: Hiroyuki Sugiyama, Isehara, Japan

[73] Assignee: Victor Company of Japan, Ltd., Yokohama, Japan

[21] Appl. No.: 345,326

[22] Filed: Feb. 3, 1982

[30] Foreign Application Priority Data

Feb. 6, 1981 [JP] Japan ................................. 56-15677

[51] Int. Cl.³ .......................................... H04N 9/493
[52] U.S. Cl. ................................................... 358/310
[58] Field of Search .......................... 358/310, 322, 11

U.S. PATENT DOCUMENTS 4,200,881 4/1980 Carnt et al. .
4,204,220 5/1980 Rutishauser .

Primary Examiner—Richard Murray
Attorney, Agent, or Firm—Louis Bernat

[57] ABSTRACT

The present invention provides a novel and useful reproducing apparatus for reproducing a rotary recording medium recorded with a color video signal.

Another and more specific object of the present invention is to provide a reproducing apparatus capable of reproducing any one of the NTSC disc, the PAL disc, or the SECAM disc so that a reproduced picture is obtained in a receiver of any of the three systems, that is, the NTSC system, the PAL system, or the SECAM system. According to the apparatus of the present invention, an arbitrary disc can be reproduced regardless of the color video signal system, and a reproduced picture can be obtained by an arbitrary receiver regardless of the system it uses.

5 Claims, 3 Drawing Figures

REPRODUCING APPARATUS FOR REPRODUCING A ROTARY RECORDING MEDIUM RECORDED WITH A COLOR VIDEO SIGNAL

BACKGROUND OF THE INVENTION

The present invention generally relates to reproducing apparatuses for reproducing a rotary recording medium (hereinafter simply referred to as a disc) recorded with a color video signal, and more particularly to a reproducing apparatus capable of compensating for the phase shift and reproducing a disc recorded with a color video system of any of the three system, that is, a disc recorded with a NTSC system color video signal (hereinafter referred to as an NTSC disc), a disc recorded with a PAL system color video signal (hereinafter referred to as a PAL system disc), or a disc recorded with SECAM system color video signal (hereinafter referred to as a SECAM system disc). The reproducing apparatus according to the present invention is capable of obtaining a finely reproduced picture with a receiver of any one of the above three systems, that is, the NTSC system, the PAL system, or the SECAM system.

Generally, as a color video signal system, there are the NTSC system, the PAL system, the SECAM system, and the like. The color television broadcasting uses any one of the above systems, and the system used is usually unified within a country. However, in the case of a disc reproducing apparatus, there are times when it is desirable to reproduce a disc of a system other than the color television broadcasting system used in that country, according to the program contents of the video signal recorded in the disc. Accordingly, it is highly desirable for the disc reproducing apparatus to have a construction such that the disc reproducing apparatus can reproduce a disc of any one of the above systems.

Furthermore, it is desirable for the disc reproducing apparatus to be designed so that a color television receiver of any one of the above systems can be connected to this disc reproducing apparatus. By this kind of a design, it becomes unnecessary to manufacture reproducing apparatuses exclusively for one particular system according to the color television broadcasting system used, and a single kind of reproducing apparatus may be used in any country using any one of the above systems. This feature will especially be effective when neighboring countries used different color television broadcasting systems.

In addition, in the reproducing apparatus, due to such causes as irregular rotation of the disc, eccentricity of the disc, and curves formed in the recording surface of the disc, a time-base fluctuation component (hereinafter referred to as jitter) is included within the reproduced color video signal. Accordingly, in the conventional disc reproducing apparatus, a circuit is provided for compensating for the above jitter. This circuit separates a horizontal synchronizing signal from the reproduced color video signal, compares the phases of the separated horizontal synchronizing signal and an output signal of a crystal oscillator, and compensates for the jitter by use of an output error signal obtained as a result of the phase comparison.

However, the jitter within the reproduced color video signal could not be sufficiently compensated, by use of the jitter compensation circuit alone, in the above conventional reproducing apparatus. There was a disadvantage in that some jitter still remained within the reproduced color video signal after performing jitter compensation by the above jitter compensation circuit. On the other hand, generally, an automatic phase compensation circuit (APC circuit), an automatic chrominance control circuit (ACC circuit), and the like are provided in a television receiver. However, the television receiver is generally designed to receive broadcast signals having no jitter and displays a received image on the screen, and measures are not taken with respect to signals having jitter. Hence, when the reproduced signal in which some still remains as described above, is supplied as it is to the television receiver, the hue and color saturations of the reproduced color picture varies according to the performance of the APC circuit and the ACC circuit which differ according to the manufacturer of the television receiver. Therefore, there was a disadvantage in that a reproduced color picture having a regular and stable quality could not be obtained.

SUMMARY OF THE INVENTION

Accordingly, it is a general object of the present invention to provide a novel and useful reproducing apparatus for reproducing a rotary recording medium recorded with a color video signal, in which the above described disadvantages have been overcome.

Another and more specific object of the present invention is to provide a reproducing apparatus capable of reproducing any one of the NTSC disc, the PAL disc, or the SECAM disc so that a reproduced picture is obtained in a receiver of any of the three systems, that is, the NTSC system, the PAL system, or the SECAM system. According to the apparatus of the present invention, an arbitrary disc can be reproduced regardless of the color video signal system, and a reproduced picture can be obtained by an arbitrary receiver regardless of the system it uses.

Still another object of the present invention is to provide a reproducing apparatus capable of reproducing any one of the NTSC disc, the PAL disc, or the SECAM disc, by effectively eliminating the phase shift.

Other objects and further features of the present invention will be apparent from the following detailed description when read in conjunction with the accompanying drawings.

DETAILED DESCRIPTION

Figure 1:
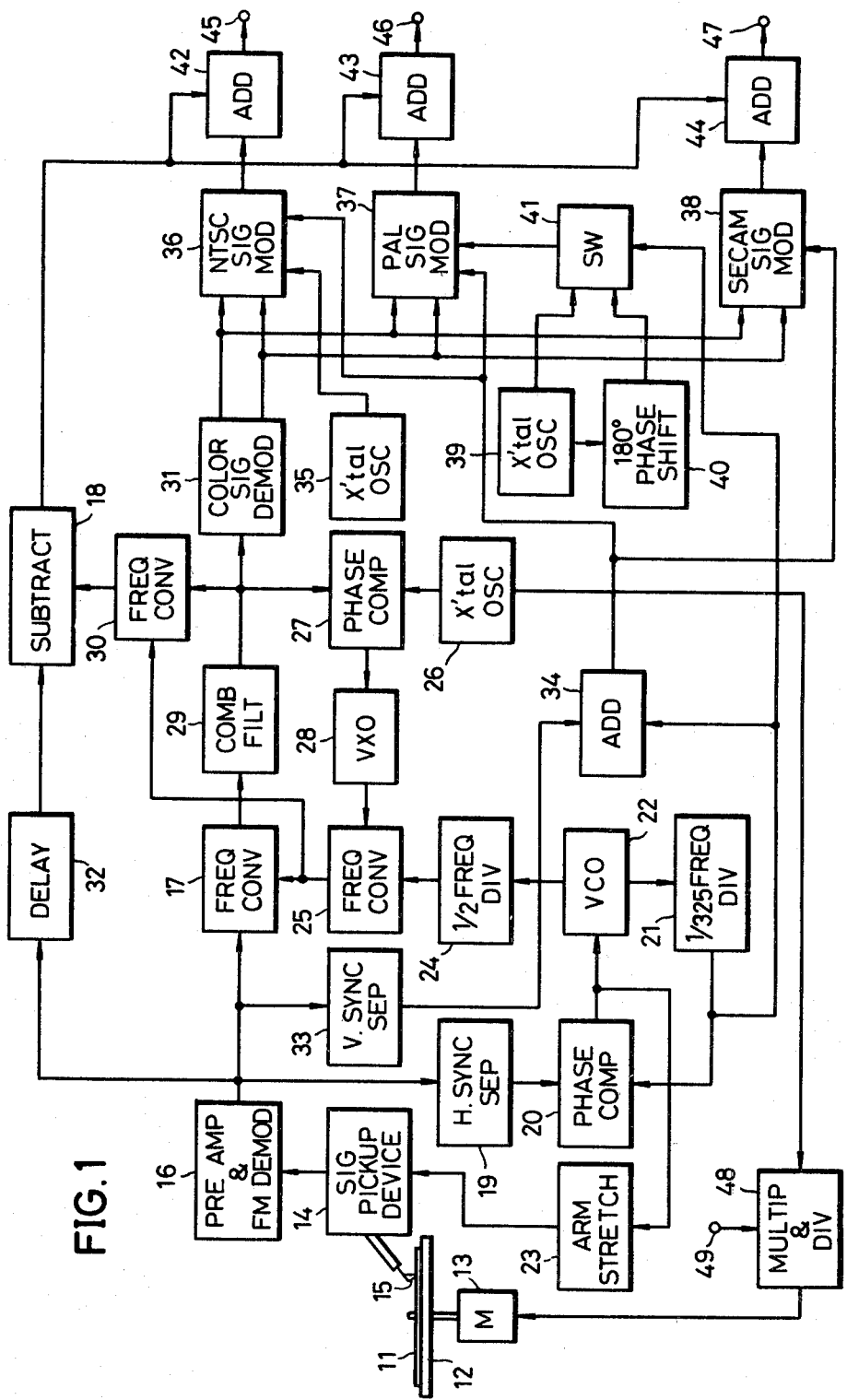
FIG. 1 is a systematic block diagram showing an embodiment of a reproducing apparatus according to the present invention.

In FIG. 1, a disc 11 on which a color video signal of four fields is recorded for one track turn, for example, as variations in geometrical configuration, is placed onto a turntable 12. The disc is rotated at a predetermined rotational speed by a motor 13, together with the turntable 12. In a case where the disc 11 is a PAL disc or a SECAM disc, the motor 13 is rotated at a rotational speed of 750 rpm. On the other hand, when the disc 11 is a SECAM disc, the motor 13 is rotated at a rotational speed of 892.85712 rpm. Since the motor 13 is rotated at the above described rotational speed, a horizontal scanning frequency $f_H$ of the reproduced NTSC system color video signal becomes equal to a horizontal scanning frequency of 15.625 kHz of the PAL system color video signal. Accordingly, the reproduced NTSC system color video signal is processed as an artificial PAL system color video signal.

The color video signal recorded on the disc 11 is picked up by a reproducing stylus 15 of a signal pickup device 14, according to variations in electrostatic capacitance between the disc 11 and the reproducing stylus 15. The signal thus picked up by the signal pickup device 14 is supplied to a circuit 16 consisting of a preamplifier and a FM-demodulating circuit, wherein the signal is demodulated. An output color video signal of the above circuit 16 is supplied to a frequency converter 17, a subtraction circuit 18, and a horizontal synchronizing signal separation circuit 19. The above color video signal is, for example, a signal obtained by multiplexing a luminance signal having a band of zero to approximately 3 MHz and a carrier chrominance signal having a band of 2.56 MHz ±500 kHz, within a commmon band.

A horizontal synchronizing signal (the frequency $f_H$ of the horizontal synchronizing signal is 15.625 kHz) separated at the horizontal signal separation circuit 19 is supplied to a phase comparator 20. The phase comparator 20 compares the phases of the above separated horizontal synchronizing signal and a signal obtained from a 1/325-frequency divider 21 having a frequency $f_H$. An output error voltage of the phase comparator 20 is supplied to a voltage controlled oscillator (VCO) 22, to control the oscillation frequency of the VCO 22. The output oscillation frequency of the VCO 22 is $325f_H$. An output of the VCO 22 is supplied to the 1/325-frequency divider 21 and a ½-frequency divider 24. The above phase comparator 20, the VCO 22, and the frequency divider 21 construct a phase locked loop (PLL) circuit in order to control the oscillation frequency of the VCO 22 so that a jitter component within the color video signal is relatively eliminated.

The output of the phase comparator 20 is also applied to an arm stetcher (a jitter compensation mechanism, not shown) of the signal pickup device, through an arm stretcher circuit 23. The position of the reproducing stylus 15 along the relative scanning direction with respect to the disc 11 is corrected by the above mechanism, to perform the jitter compensation mechanically.

The output signal of the VCO 22 having the frequency of $325f_H$, is supplied to the ½-frequency divider 24 wherein the frequency is frequency-divided into a frequency of $325f_H/2$. This signal having the frequency of $325f_H/2$ is supplied to a frequency converter 25. A signal from the frequency divider 24 is frequency-converted at the frequency converter 25, by a signal obtained from a voltage controlled type crystal oscillator (VXO) 28 having a frequency of 4.43 MHz. Accordingly, the signal from the frequency divider 24 is frequency-converted into a signal having a frequency of 6.99 MHz. An output signal of the frequency converter 25 is supplied to frequency converters 17 and 30.

The color video signal (having a carrier chrominance signal having a frequency of 2.56 MHz) including the jitter component, which is obtained from the circuit 16, is frequency-converted into a signal having a frequency of 4.43 MHz by a signal (having a frequency of 6.99 MHz) from the frequency converter 25, at the frequency converter 17. The output signal of the frequency converter 17 is supplied to a comb filter 29. A carrier chrominance signal having a frequency of 4.43 MHz which is obtained at the above comb filter 29, is supplied to a chrominance signal demodulating circuit 31, a phase comparator 27, and the frequency converter 30. The comb filter 29 has a 1H delay circuit for delaying by an interval equal to one horizontal scanning period (1H) of the PAL system or the SECAM system. The reason why the reproduced horizontal scanning frequency is set so that the horizontal scanning frequencies of the PAL system and the SECAM system can be obtained regardless of the system of the video signal recorded on the disc being reproduced, and the delay time of the comb fitler 29 is set to one horizontal scanning period of the PAL system and the SECAM system, is that a 1H delay circuit is respectively provided in the PAL system receiver and the SECAM system receiver. By this arrangement, it becomes possible to obtain a normal picture in the PAL system receiver and the SECAM system receiver.

The phase comparator 27 compares the phases of the carrier chrominance signal from the above comb filter 29 having the frequency of 4.43 MHz, and a reference signal supplied from a crystal oscillator 26 which has a frequency of 4.43 MHz. An output error voltage of the phase comparator 27 is applied to the VXO 28, to control the oscillation frequency of the VXO 28. Accordingly, the oscillation frequency of the VXO 28 fluctuates according to the jitter component present in the carrier chrominance signal which is obtained from the comb filter 29. A closed loop consisting of the frequency converters 17 and 25, the comb filter 29, the phase comparator 27, and the VXO 28 constructs an automatic phase compensation (APC) circuit. Thus, compensation is performed by the above described arm stretcher and the PLL circuit, to compensate relatively for the remaining jitter component. An oscillation frequency $f_{sc}$ of the crystal oscillator 26 can be described by an equation $f_{sc}=(N/2)\cdot f_H$, where N is an odd integer. In the present embodiment of the invention, the frequency $f_{sc}$ is selected to approximately 4.43 MHz.

The carrier chrominance signal obtained from the comb filter 29, having the frequency of 4.43 MHz, is frequency-converted by a signal from the frequency converter 25 having the frequency of 6.99 MHz and a time-base which fluctuates according to the jitter component, at the frequency converter 30. The carrier chrominance signal including the jitter component and having the frequency of 2.56 MHz, is supplied to the subtraction circuit 18 from the frequency converter 30. The color video signal including the jitter component is supplied to the subtraction circuit 18 through a delay circuit 32 for matching the timing. Hence, the carrier chrominance signal is eliminated from the color video signal at the subtraction circuit 18, and only the luminance signal is obtained. This luminance signal thus obtained, is supplied to adders 42, 43, and 44.

The output signal of the circuit 16 is also supplied to a vertical synchronizing signal separation circuit 33 wherein the vertical synchronizing signal is separated. The separated vertical synchronizing signal is supplied to an adder 34, and added with the signal from the 1/325-frequency divider 21 having the horizontal scanning frequency $f_H$. Thus, a composite synchronizing signal is obtained from the adder 34. This composite synchronizing signal is supplied to an NTSC signal modulating circuit 36, a PAL signal modulating circuit 37, and a SECAM signal modulating circuit 38.

Figure 2:
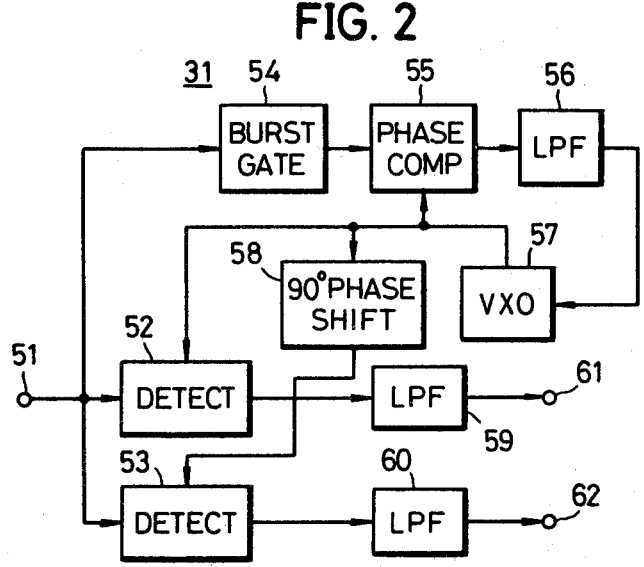
FIG. 2 is a systematic block diagram showing one example of a chrominance signal demodulating circuit within the block system shown in FIG. 1.

The chrominance signal demodulating circuit 31 has a circuit construction shown in the systematic block diagram in FIG. 2, for example. The output carrier chrominance signal of the comb filter 29 supplied to the chrominance signal demodulating circuit 31 from an input terminal 51, is supplied to detectors 52 and 53, and to a burst gate 54. This carrier chrominance signal is mostly eliminated of the jitter component, however, slight jitter component still remains within the carrier chrominance signal.

A color burst signal extracted at the burst gate 54 is supplied to a phase comparator 55. The phase comparator 55 compares the phases of the signal supplied thereto and the output signal from a VXO 57 having a frequency of 4.43 MHz. An output phase error signal of the phase comparator 55 is applied to the VXO 57 through a lowpass filter 56, to control the oscillation frequency of the VXO 57. In addition to being supplied to the phase comparator 55, the output signal of the VXO 57 is also supplied directly to the detector 52, and to the detector 53 through a 90°-phase shifter 58. Accordingly, color difference signals from which the jitter component is completely compensated, are obtained from the above detectors 52 and 53. These color difference signals are respectively supplied to modulating circuits 36, 37, and 38 through lowpass filters 59, 60 and output terminals 61 and 62, respectively.

The filtering band of the above lowpass filter 56 is selected so as to sufficiently pass the jitter component. In a case where the disc 11 is rotated at a rotational speed of 852.85712 rpm or 750 rpm, for example, the jitter frequency is 15 Hz or 12.5 Hz. Thus, in this case, the upper limit frequency of the filtering band of the lowpass filter 56 is selected in the range of 60 Hz, for example, so that the signal having this frequency of 15 Hz or 12.5 Hz is sufficiently passed.

Figure 3:
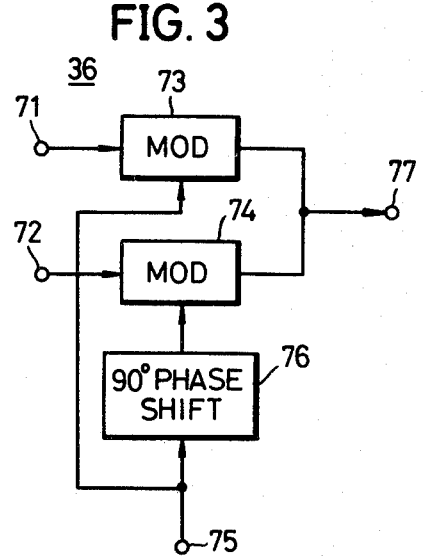
FIG. 3 is a systematic block diagram showing one example of a modulating circuit within the block system shown in FIG. 1.

An output signal of a crystal oscillator 35 having a frequency of 3.58 MHz, is supplied to the NTSC signal modulating circuit 36 as a chrominance subcarrier. The modulating circuit 36 has a circuit construction shown in the block system in FIG. 3, for example. The color difference signals from the chrominance signal demodulating circuit 31, are supplied to modulators 73 and 74 through terminals 71 and 72, respectively. The output signal of the crystal oscillator 35 is directly supplied to the modulator 73 through the terminal 75, and supplied to the modulator 74 through a 90°-phase shifter 76. The chrominance signals subjected to quadrature two-phase modulation at the modulators 73 and 74, is supplied to the adder 42 through a terminal 77. The chrominance signal and the luminance signal from the subtraction circuit 18, are multiplexed at the adder 42. Accordingly, an NTSC system color video signal (to be accurate, this is an artificial NTSC system color video signal) is obtained from a terminal 45.

The chrominance signal and the luminance signal added at the adder 42 are respectively compensated of the phase shift component, however, they include the same time-base fluctuation component. But, this time-base fluctuation component is the same, respectively, with respect to the chrominance signal and the luminance signal. Hence, relatively, no inconveniences are introduced. Moreover, the time-base fluctuation component is compensated at an automatic frequency control (AFC) circuit provided in the receiver, and color aberration is not introduced in the reproduced picture.

An output of a crystal oscillator 39 having a frequency of 4.43361875 MHz, is supplied to a switching circuit 41 on one hand, and supplied to the switching circuit 41 after being phase-shifted by 180° at a 180°-phase shifter 40.

The above switching circuit 41 is supplied with the output signal (having the frequency $f_H$ equal to 15.625 kHz) of the 1/325-frequency divider 21, and performs a switching operation for every one horizontal scanning period (1H). Hence, the switching circuit 41 alternately switches the signals from the crystal oscillator 39 and the 180°-phase shifter 40 for every 1H, and supplies the switched signal to the PAL signal modulating circuit 37.

The PAL signal modulating circuit 37 modulates the chrominance sub carrier from the switching circuit 41, by the color difference signals from the demodulating circuit 31. A quadrature two-phase modulated signal obtained from the modulating circuit 37 is supplied to the adder 43, and added with the luminance signal from the subtracting circuit 18. Thus, a PAL system (or artificial PAL system) color video signal is obtained from the terminal 46.

The color difference signals supplied to the SECAM signal modulating circuit 38 from the chrominance signal demodulating circuit 31, are added with the composite synchronizing signal from the adder 34. Moreover, these color difference signals are switched over by a horizontal scanning frequency signal within the composite synchronizing signal for every one horizontal scanning period, and line-sequentially converted into a chrominance signal. The chrominance signal from the modulating circuit 38 is supplied to the adder 44, and added with the luminance signal from the subtracting circuit 18. Accordingly, a SECAM system (or an artificial SECAM system) color video signal is obtained from the terminal 47.

The output signal of the crystal oscillator 26 is supplied to a circuit 48 consisting of a frequency multiplier and frequency divider. The frequency multiplying ratio or the frequency dividing ratio of the circuit 48 is changed over by a signal applied to a terminal 49 according to whether the disc being reproduced is of the NTSC system, the PAL system, or the SECAM system. Accordingly, according to the output from the circuit 48, the motor 13 is rotated at a rotational speed of 892.85712 rpm when the disc is the NTSC disc, and 750 rpm when the disc is the PAL or SECAM disc.

If the color television receiver used to obtain the reproduced picture is of the NTSC system, the receiver is connected to the terminal 45. Similarly, if the receiver is of the PAL system or the SECAM system, the receiver is respectively connected to the terminals 46 and 47.

Generally, the jitter component includes a phase shift component having a phase shift from a certain reference signal to give undesirable effects to the color phase, and a time shift component having a period different from that of the certain reference signal. However, the output signal including jitter, obtained from the comb filter 15, is eliminated only of the phase shift component at the demodulating circuit 16.

According to the reproducing apparatus of the present invention, modulation in accordance with the NTSC system, the PAL system, and the SECAM system is respectively performed at the modulating circuits 36, 37, and 38, by using the color difference signals from the demodulating circuit 31. Thus, when any one of the NTSC system, the PAL system, or the SECAM system disc is reproduced, the NTSC system color video signal, the PAL system color video signal, and the SECAM system color video signal are respectively obtained from the terminals 45, 46, and 47, simultaneously. Therefore, regardless of which disc is reproduced, the reproduced picture can be obtained in the NTSC system color television receiver, the PAL system color television receiver, and the SECAM color television receiver.

When the NTSC disc is reproduced, the horizontal scanning frequency is reproduced as the horizontal scanning frequency of 15.625 kHz of the PAL system and the SECAM system, which is different from the original horizontal scanning frequency of 15.734 kHz of this NTSC disc. Moreover, the carrier chrominance signal (of the frequency 4.43 MHz) of the PAL system and the SECAM system is obtained and processed at the comb filter 15 including the 1H delay circuit for delaying by the interval equal to one horizontal scanning period of the PAL system and the SECAM system. Accordingly, when the NTSC system color video signal obtained from the output terminal 45 is reproduced by the NTSC system color television receiver, the reproduced picture obtained is slightly distorted along the horizontal direction. However, this distortion is only in the range of few percent at the most, and does not introduce any problems from the practical point of view. In addition, in this case, the horizontal scanning frequency of 15.5625 kHz of the PAL system and the SECAM system is obtained, and the PAL modulation and the SECAM modulation are performed by using the color difference signals from the demodulating circuit 31 which is supplied with the carrier chrominance signal (of 4.43 MHz) of the PAL system and the SECAM system. Hence, when the PAL system color video signal obtained from the output terminal 46 and the SECAM system color video signal obtained from the output terminal 47 are respectively reproduced by the PAL system color television receiver and the SECAM system color television receiver, the reproduced picture becomes slightly distorted along the vertical direction, although correct along the horizontal direction. However, this distortion along the vertical direction is in the range of few percent at the most, and is not a problem practically.

On the other hand, when the PAL system and SECAM system discs are reproduced, the original horizontal scanning frequency of 15.625 kHz of the PAL system and the SECAM system is produced and processed. Thus, when the PAL system color video signal from the output terminal 46 and the SECAM system color video signal from the output terminal 47 are respectively reproduced by the PAL system television receiver and the SECAM system television receiver, the reproduced picture is correct and normal with respect to the horizontal and vertical directions of the reproduced picture. In addition, in this case, when the NTSC system color video signal from the output terminal 45 is reproduced by the NTSC system television receiver, the reproduced picture becomes slightly distorted both along the horizontal and vertical directions. However, the distortion is small, and is not a problem practically.

Accordingly, strictly speaking, regardless of which disc is reproduced, that is, the NTSC disc, the PAL disc, or the SECAM disc, an artificial NTSC system color video signal is always obtained from the terminal 45. When the PAL disc is reproduced, the regular PAL system color video signal is obtained from the terminal 46, while an artificial PAL system color video signal is obtained from the terminal 46 when the NTSC disc or the SECAM disc is reproduced. The regular SECAM system color video signal is obtained from the terminal 47 when the SECAM disc is reproduced. On the other hand, an artificial SECAM system disc is obtained when the NTSC disc or the PAL disc is reproduced.

Further, the present invention is not limited to these embodiments, but various variations and modifications may be made without departing from the scope of the present invention.

What is claimed is:

1. A reproducing apparatus comprising:

rotating means for rotating a rotary recording medium so that a horizontal scanning frequency of a video signal reproduced from any one of an NTSC rotary recording medium recorded with an NTSC system color video signal, a PAL rotary recording medium recorded with a PAL system color video signal, and a SECAM rotary recording medium recorded with a SECAM system color video signal, becomes equal to a horizontal scanning frequency of the PAL or SECAM system color video signal;

carrier chrominance signal separating means for separating a carrier chrominance signal from a color video signal reproduced from the rotary recording medium;

luminance signal separating means for separating a luminance signal from said reproduced color video signal;

a demodulating circuit for demodulating said separated carrier chrominance signal into two color difference signals;

reference signal producing means for producing reference signals having first and second predetermined frequencies;

first modulating means supplied with the reference signal from said reference signal producing means having the first predetermined frequency as a chrominance subcarrier, for modulating this reference signal by the color difference signals from said demodulating circuit, to obtain an artificial NTSC system chrominance signal;

first adding means for adding an output signal of said first modulating means and said separated luminance signal, to obtain an artificial NTSC system color video signal;

second modulating means supplied with the reference signal from said reference signal producing means having the second predetermined frequency as a chrominance subcarrier, for modulating this reference signal by the color difference signals from said demodulating, to obtain a PAL system chrominance signal or an artificial PAL system chrominance signal;

second adding means for adding output signal of said second modulating means and said separated luminance signal, to obtain a PAL system color video signal or an artificial PAL system color video signal;

horizontal synchronizing signal separating means for separating a horizontal synchronizing signal from said reproduced color video signal;

third modulating means for forming a line-sequential signal from the color difference signals from said demodulating circuit by using the horizontal synchronizing signal or a horizontal scanning frequency signal formed in response to the horizontal synchronizing signal, to obtain a SECAM system chrominance signal or an artificial SECAM system chrominance signal; and third adding means for adding an output signal of said third modulating means and said separated luminance signal, to obtain a SECAM system color video signal or an artificial SECAM system color video signal.

2. A reproducing apparatus as claimed in claim 1 in which said second modulating means comprises:

a phase shifting circuit for shifting the phase of the signal from said reference signal producing means by 180 degrees;

switching circuit for switching the signal from said reference signal producing means and a signal from said phase shifting circuit, every one horizontal scanning period, by said separated horizontal synchronizing signal or the horizontal scanning frequency signal formed in response to the horizontal synchronizing signal; and a modulating circuit supplied with the reference signal from said reference signal producing means and a signal from said switching circuit, for to respectively modulate these signals by the color difference signals from said demodulating circuit.

3. A reproducing apparatus as claimed in claim 1 in which said carrier chrominance signal separating means comprises a comb filter for extracting the carrier chrominance signal from the reproduced color video signal with respect to the luminance signal, said comb filter having a delay time equal to one horizontal scanning period of the PAL or SECAM system color video signal.

4. A reproducing apparatus as claimed in claim 1 in which said rotary recording medium is recorded with four fields of video signal for one track turn, and said rotating means rotates said NTSC rotary recording medium at a rotational speed of 892.85712 rpm, and rotates said PAL or SECAM rotary recording medium at a rotational speed of 750 rpm.

5. A reproducing apparatus as claimed in claim 1 in which said demodulating circuit has demodulators for demodulating said carrier chrominance signal into said two color difference signals, an oscillator for supplying a predetermined frequency signal to said demodulators, and a control circuit for controlling the oscillation frequency of said oscillator according to a jitter component in said carrier chrominance signal.

* * * * *